United States Patent [19]
Berstis et al.

[11] Patent Number: 5,903,266
[45] Date of Patent: May 11, 1999

[54] AUDIO SETUP AND USE INSTRUCTIONS

[75] Inventors: Viktors Berstis, Austin; Manish M. Modh, Round Rock, both of Tex.

[73] Assignee: International Business Machines Corporation, Armonk, N.Y.

[21] Appl. No.: 08/801,663

[22] Filed: Feb. 18, 1997

[51] Int. Cl.⁶ .................................................. G09B 5/00
[52] U.S. Cl. .................... 345/338; 345/978; 434/319
[58] Field of Search ........................... 345/326, 327, 345/336, 337, 338, 339, 348, 978, 145; 434/118, 308, 319, 365, 112, 116

[56] References Cited

U.S. PATENT DOCUMENTS

| | | | |
|---|---|---|---|
| 4,867,685 | 9/1989 | Brush et al. ........................... | 434/234 |
| 5,183,398 | 2/1993 | Monte et al. .......................... | 434/227 |
| 5,223,828 | 6/1993 | McKiel, Jr. .......................... | 434/116 X |
| 5,287,102 | 2/1994 | McKiel, Jr. .......................... | 434/116 X |
| 5,377,319 | 12/1994 | Kitahara et al. ....................... | 345/337 |
| 5,442,759 | 8/1995 | Chiang et al. ........................ | 345/336 X |
| 5,461,399 | 10/1995 | Cragun ................................ | 345/145 |
| 5,577,186 | 11/1996 | Mann, II et al. ...................... | 345/302 |
| 5,687,334 | 11/1997 | Davis et al. .......................... | 345/339 |

*Primary Examiner*—Matthew M. Kim
*Assistant Examiner*—Crescelle N. dela Torre
*Attorney, Agent, or Firm*—Jeffrey S. LaBaw; Daniel E. Venglarik; Andrew J. Dillon

[57] ABSTRACT

In a data processing system with built in audio capability, audio setup instructions are provided. Delivery of the instructions begins after the system is plugged in. Once a video connection has been established, the audio instructions may be supplemented with directly relevant visual information. The object of each instruction may be tested for successful completion. Additional instructions and information may be provided, or optional instructions and information skipped, depending on the requirements of the individual setup.

19 Claims, 6 Drawing Sheets

AUDIO SETUP AND USE INSTRUCTIONS

BACKGROUND OF THE INVENTION

1. Technical Field

The present invention relates in general to data processing systems and in particular to an improved method of delivering setup instructions for data processing systems. Still more particularly, the present invention relates to providing setup instructions which are simple to understand and tailored to an individual setup.

2. Description of the Related Art

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Operating costs may be reduced by providing informational guides and/or searchable databases of public records online.

The largest segment of the consuming public does not currently have access to these resources. Such consumers are typically either unable or unmotivated to acquire both the requisite hardware and software and the necessary computer skills for taking advantage of these resources. There is a need for low cost data processing systems which are simple to operate, allowing users without computer skills the opportunity to access the Internet. This need is being addressed, to some extent, by "WebTV" systems.

In designing a low cost, simple data processing system, however, it is necessary to presume that the target user is unsophisticated and/or inexperienced. Therefore the operation of the data processing system must be both simple and intuitive, requiring little or no technical sophistication on the part of the user. In this regard, it would be advantageous to provide setup instructions for newly purchased data processing systems which are simple to understand, easy to follow, and tailored to each individual setup.

Conventional data processing systems are sold with little or no setup instructions. Typically a purchaser receives a small bundle of technical documentation, but little or no guidance on how to connect monitors, keyboards, etc. In cases where such setup instructions are provided, they are usually cryptic written instructions with diagrams and terminology confusing to a novice. Moreover, written instructions invariably contain descriptions of alternatives or peculiarities which may be irrelevant to a specific setup.

Even in the simplest data processing systems, some tangible, electrical connections and some software settings are required to in setting up the system. A system may not become fully operational, or the system may not perform to its capacity level, until such connections and settings are established. Without clear, concise, and easy to follow instructions which walk a user through the setup process, a novice user may not be able to set up a newly purchased data processing system. Technical service or assistance may be required, increasing the cost of the data processing system to the user and the manufacturer.

Graphical user interfaces may also be somewhat cryptic. The information conveyed by the graphical nature of an icon and any associated description is typically fairly limited. Therefore it would be beneficial to provide a user of a data processing system with additional information regarding the function of an icon.

It would be desirable, therefore, to provide setup instructions in a manner which any user can easily follow, without any advance technical knowledge. It would also be desirable to provide these instructions through medium which does not rely on a user's reading skills. It would further be advantageous if the setup instructions communicated to the user were automatically tailored for each individual setup. Such a method of delivering setup instructions could save a user time and frustration, and also facilitate proper setup of the data processing system.

SUMMARY OF THE INVENTION

It is therefore one object of the present invention to provide an improved data processing system.

It is another object of the present invention to provide an improved method of delivering setup instructions for data processing systems.

It is yet another object of the present invention to provide setup instructions which are simple to understand and tailored to an individual setup.

The foregoing objects are achieved as is now described. In a data processing system with built in audio capability, audio setup instructions are provided. Delivery of the instructions begins after the system is plugged in. Once a video connection has been established, the audio instructions may be supplemented with directly relevant visual information. The object of each instruction may be tested for successful completion. Additional instructions and information may be provided, or optional instructions and information skipped, depending on the requirements of the individual setup.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figures 1A, 1D:
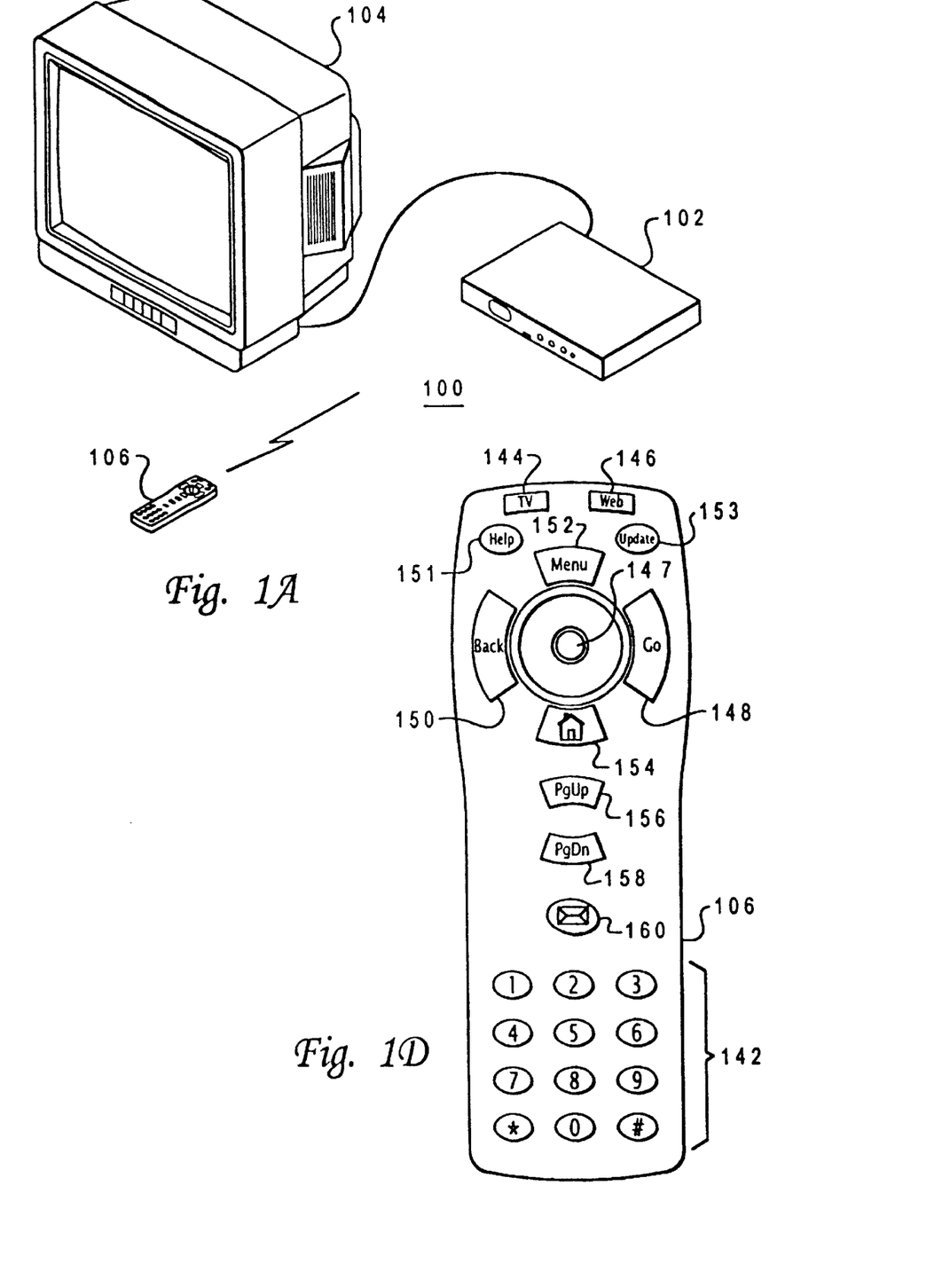
FIGS. 1A–1D depicts various pictorial representations of a data processing system in which a preferred embodiment of the present invention may be implemented.

With reference now to the figures, and in particular with reference to FIGS. 1A through 1D, various pictorial representations of a data processing system in which a preferred embodiment of the present invention may be implemented are depicted. FIG. 1A is a pictorial representation of the data processing system as a whole. Data processing system 100 in the depicted example provides, with minimal economic costs for hardware to the user, access to the Internet. Data processing system 100 includes a data processing unit 102. Data processing unit 102 is preferably sized to fit in typical entertainment centers and provides all required functionality, conventionally found in personal computers, to enable a user to "browse" the Internet. Additionally, data processing unit 102 may provide other common functions such as serving as an answering machine or receiving facsimile transmissions.

Data processing unit 102 is connected to television 104 for display of graphical information. Television 104 may be any suitable television, although color televisions with an S-Video input will provide better presentations of the graphical information. Data processing unit 102 may be connected to television 104 through a standard coaxial cable connection. A remote control unit 106 allows a user to interact with and control data processing unit 102. Remote control unit 106 emits infrared (IR) signals, preferably modulated at a different frequency than the normal television, stereo, and VCR infrared remote control frequencies in order to avoid interference. Remote control unit 106 provides the functionality of a pointing device in conventional personal computers, including the ability to move a cursor on a display and select items.

Figure 1B:
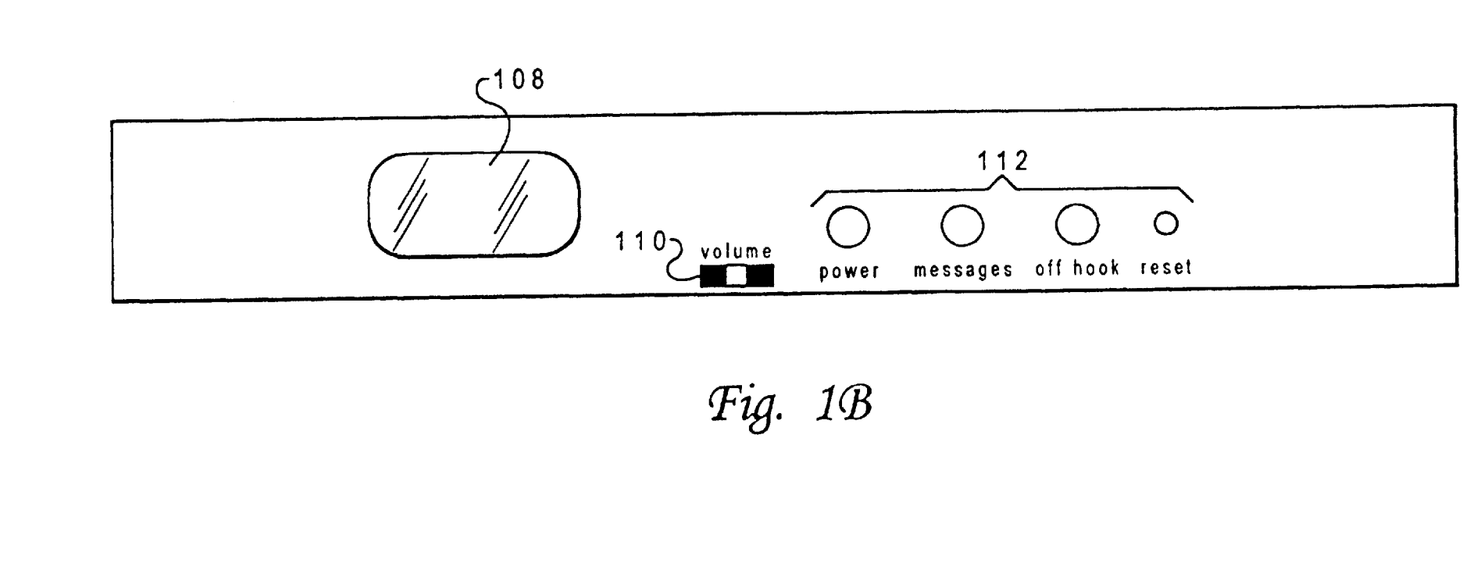

FIG. 1B is a pictorial representation of the front panel of data processing unit 102 in accordance with a preferred embodiment of the present invention. The front panel includes an infrared window 108 for receiving signals from remote control unit 106 and for transmitting infrared signals. Data processing unit 102 may transmit infrared signals to be reflected off objects or surfaces, allowing data processing unit 102 to automatically control television 104. Volume control 110 permits adjustment of the sound level emanating from a speaker within data processing unit 102 or from television 104. A plurality of light-emitting diode (LED) indicators 112 provide an indication to the user of when data processing unit 102 is on, whether the user has messages, whether the modem/phone line is in use, or whether data processing unit 102 requires service.

Figure 1C:
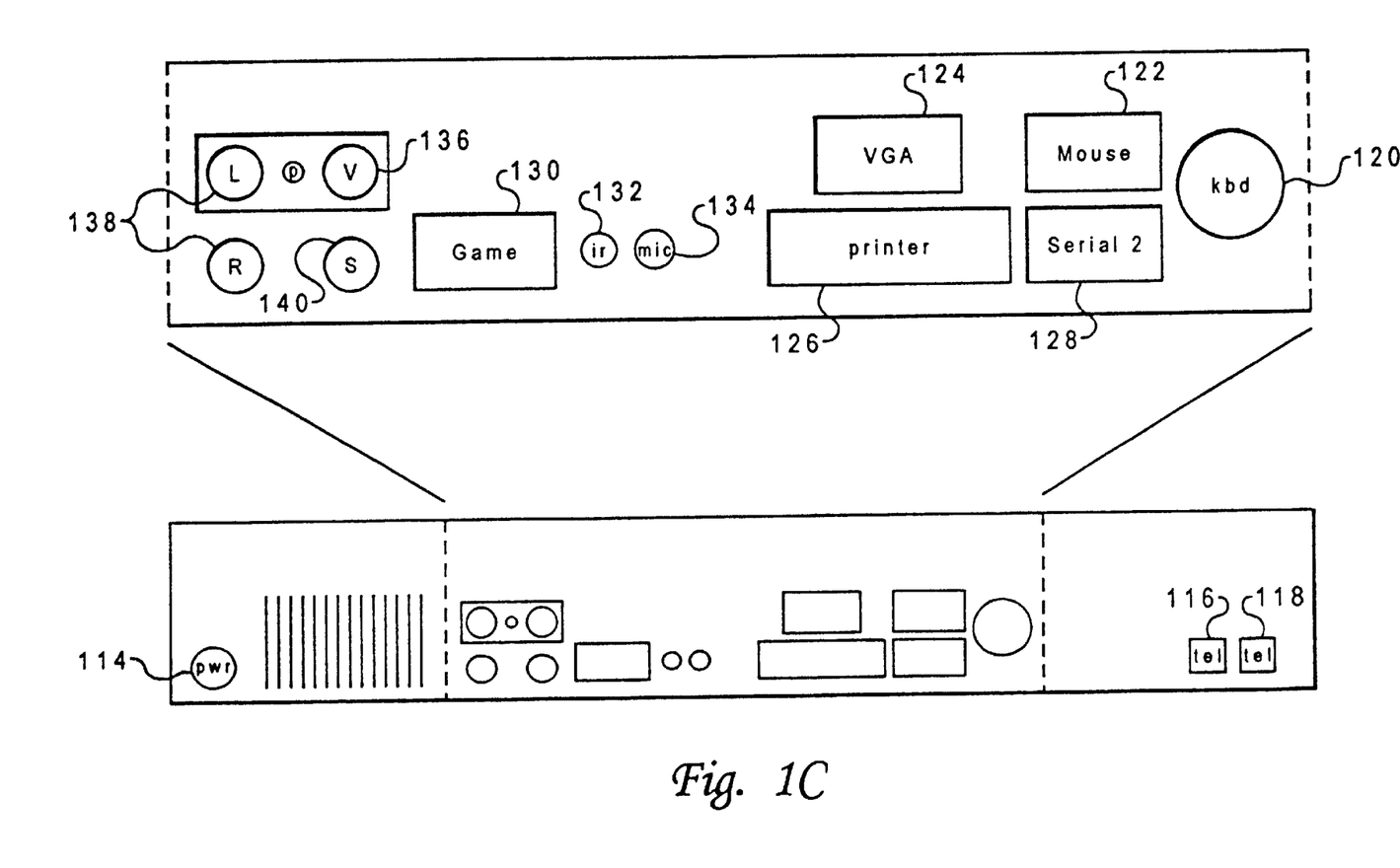

FIG. 1C is a pictorial representation of the rear panel of data processing unit 102 in accordance with a preferred embodiment of the present invention. A three wire (ground included) insulated power cord 114 passes through the rear panel. Standard telephone jacks 116 and 118 on the rear panel provide an input to a modem from the phone line and an output to a handset (not shown). The rear panel also provides a standard computer keyboard connection 120, mouse port 122, computer monitor port 124, printer port 126, and an additional serial port 128. These connections may be employed to allow data processing unit 102 to operate in the manner of a conventional personal computer. Game port 130 on the rear panel provides a connection for a joystick or other gaming control device (glove, etc.). Infrared extension jack 132 allows a cabled infrared LED to be utilized to transmit infrared signals. Microphone jack 134 allows an external microphone to be connected to data processing unit 102.

Video connection 136, a standard coaxial cable connector, connects to the video-in terminal of television 104 or a video cassette recorder (not shown). Left and right audio jacks 138 connect to the corresponding audio-in connectors on television 104 or to a stereo (not shown). If the user has S-Video input, then S-Video connection 140 may be used to connect to television 104 to provide a better picture than the composite signal. If television 104 has no video inputs, an external channel 3/4 modulator (not shown) may be connected in-line with the antenna connection.

FIG. 1D is a pictorial representation of remote control unit 106 in accordance with a preferred embodiment of the present invention. Similar to a standard telephone keypad, remote control unit 106 includes buttons 142 for arabic numerals 0 through 9, the asterisk or "star" symbol (*), and the pound sign (#). Remote control unit also includes "TV" button 144 for selectively viewing television broadcasts and "Web" button 146 for initiating "browsing" of the Internet. A pointing device, which is preferably a trackpoint or "button" pointing device, is included on remote control unit 106 and allows a user to manipulate a cursor on the display of television 104. "Go" and "Back" buttons 148 and 150, respectively, allow a user to select an option or return to a previous selection. "Menu" button 152 causes a context-sensitive menu of options to be displayed, while home button 154 allows to user to return to a default display of options. "PgUp" and "PgDn" buttons 156 and 158 allows the user to change the content of the display in display-sized blocks rather than by scrolling. The message button 160 allows the user to retrieve messages. In addition to, or in lieu of, remote control unit 106, an infrared keyboard (not shown) with an integral pointing device may be used to control data processing unit 102. The integral pointing device is preferably a trackpoint or button type of pointing device. A wired keyboard (also not shown) may also be used through keyboard connection 120, and a wired pointing device such as a mouse or trackball may be used through mouse port 122. When a user has one or more of the remote control unit 106, infrared keyboard, wired keyboard and/or wired pointing device operable, the active device locks out all others until a prescribed period of inactivity has passed.

Figure 2:
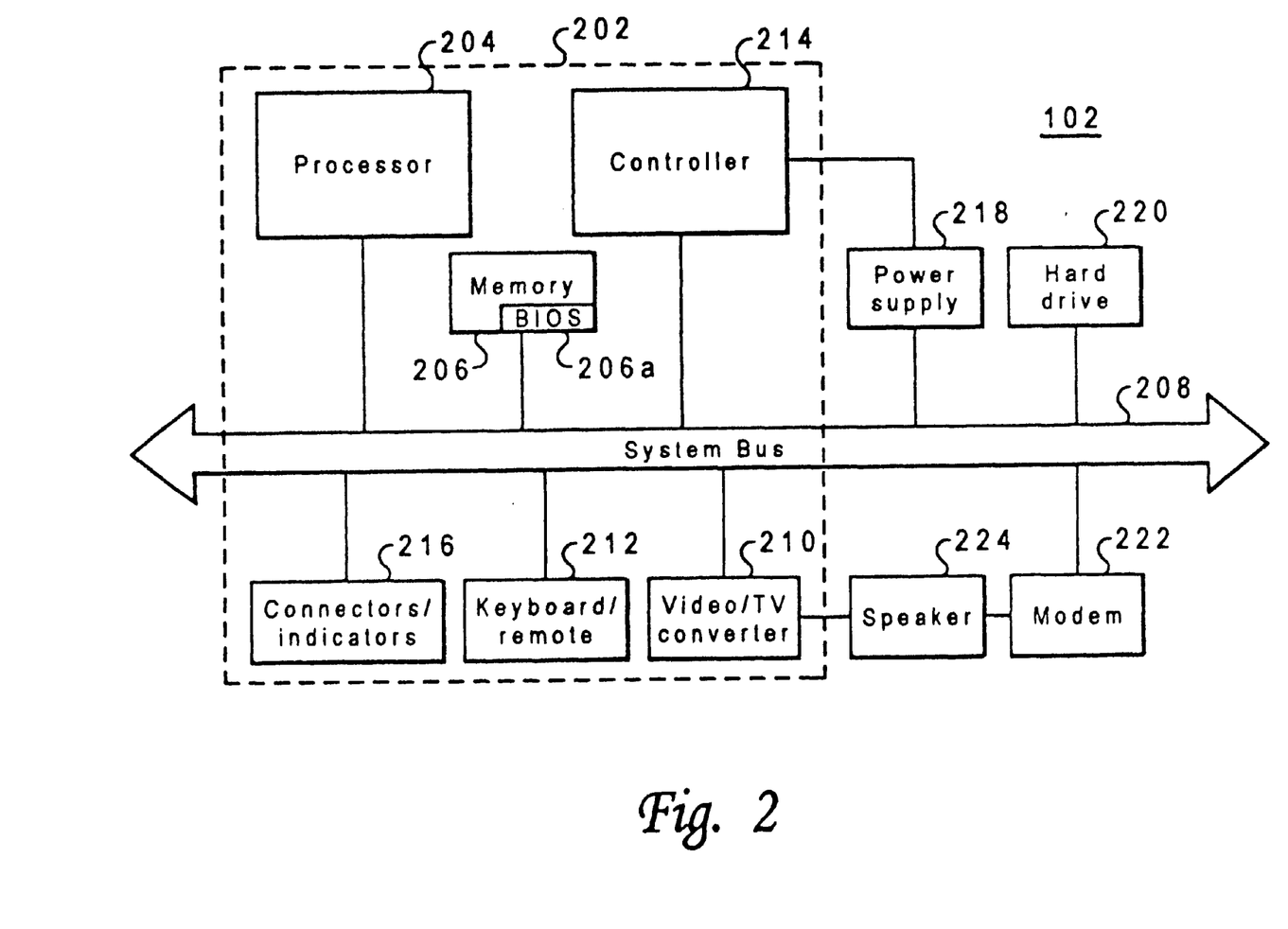
FIG. 2 is a block diagram for the major components of data processing unit in accordance with a preferred embodiment of the present invention.

Referring now to FIG. 2, a block diagram for the major components of data processing unit 102 in accordance with a preferred embodiment of the present invention is portrayed. As with conventional personal computers, data processing unit 102 includes a motherboard 202 containing a processor 204 and memory 206 connected to system bus 208. Processor 204 is preferably at least a 486 processor operating at or above 100 MHz. Memory 206 includes read only memory (ROM) 206a containing a basic input/output services (BIOS) routine and may include cache memory and/or video RAM.

Video/TV converter 210 on motherboard 202 and connected to system bus 208 generates computer video signals for computer monitors, a composite television signal, and an S-Video signal. Keyboard/remote control interface unit 212 on motherboard 202 receives keyboard codes through controller 214, regardless of whether a wired keyboard/pointing device or an infrared keyboard/remote control is being employed. Infrared remote control unit 106 transmits signals which are ultimately sent to the serial port as control signals generated by conventional mouse or pointing device movements. Two buttons on remote control unit 106 are interpreted identically to the two buttons on a conventional mouse, while the remainder of the buttons transmit signals corresponding to keystrokes on an infrared keyboard. Thus, remote control unit 106 has a subset of the functions provided by an infrared keyboard. Connectors/indicators 216 on motherboard 202 provide the connections and indicators on data processing unit 102 described above.

External to motherboard 202 in the depicted example are power supply 218, hard drive 220, modem 222, and speaker 224. Power supply 218 is a conventional power supply except that it receives a control signal from controller 214 which effects shut down of all power to motherboard 202, hard drive 220, and modem 222. In some recovery situations, removing power and rebooting is the only guaranteed method of resetting all of these devices to a known state. Thus power supply 218, in response to a signal from controller 214, is capable of powering down and restarting data processing unit 102.

Hard drive 220 contains operating system and applications software for data processing unit 102, which preferably includes: IBM DOS 7.0, a product of International Business Machines Corporation in Armonk, N.Y.; Windows 3.1, a product Microsoft Corporation in Redmond, Wash.; and Netscape Navigator, a product of Netscape Communications Corporation in Mountain View, Calif. Data may also be stored on hard drive 220. Modem 222, inserted into a slot mounted sideways on motherboard 202, is preferably a 33.6 kbps modem supporting the V.42bis, V34bis, V.34, V.17 Fax, MNP 1–5, and AT command sets.

Controller 214 is preferably one or more of the 805x family controllers. Controller 214 is continuously powered and, when data processing unit 102 is turned on, monitors the system for a periodic "ping" indicating that data processing unit 102 is operating normally. In the event that controller 214 does not receive a ping within a prescribed timeout period, controller 214 removes power from the system and restarts the system. This may be necessary, for example, when the system experiences a general protection fault. If multiple attempts to restart the system prove unsuccessful, controller 214 shut off data processing unit 102 and signals that service is required through indicators 216. Thus data processing unit 102 is capable of self-recovery without involvement by a user.

Controller 214 also receives and processes input from infrared remote control 106, infrared keyboard, wired keyboard, or wired mouse. When one keyboard or pointing device is used, all others are locked out (ignored) until none have been active for a prescribed period. Then the first keyboard or pointing device to generate activity locks out all others. Controller 214 also directly controls all LED indicators except that indicating modem use and specifies the boot sector selection during any power off-on cycle.

Those skilled in the art will recognize that the components depicted in FIGS. 1A–1D and 2 and described above may be varied for specific applications or embodiments. Such variations in which the present invention may be implemented are considered to be within the spirit and scope of the present invention.

Figure 3:
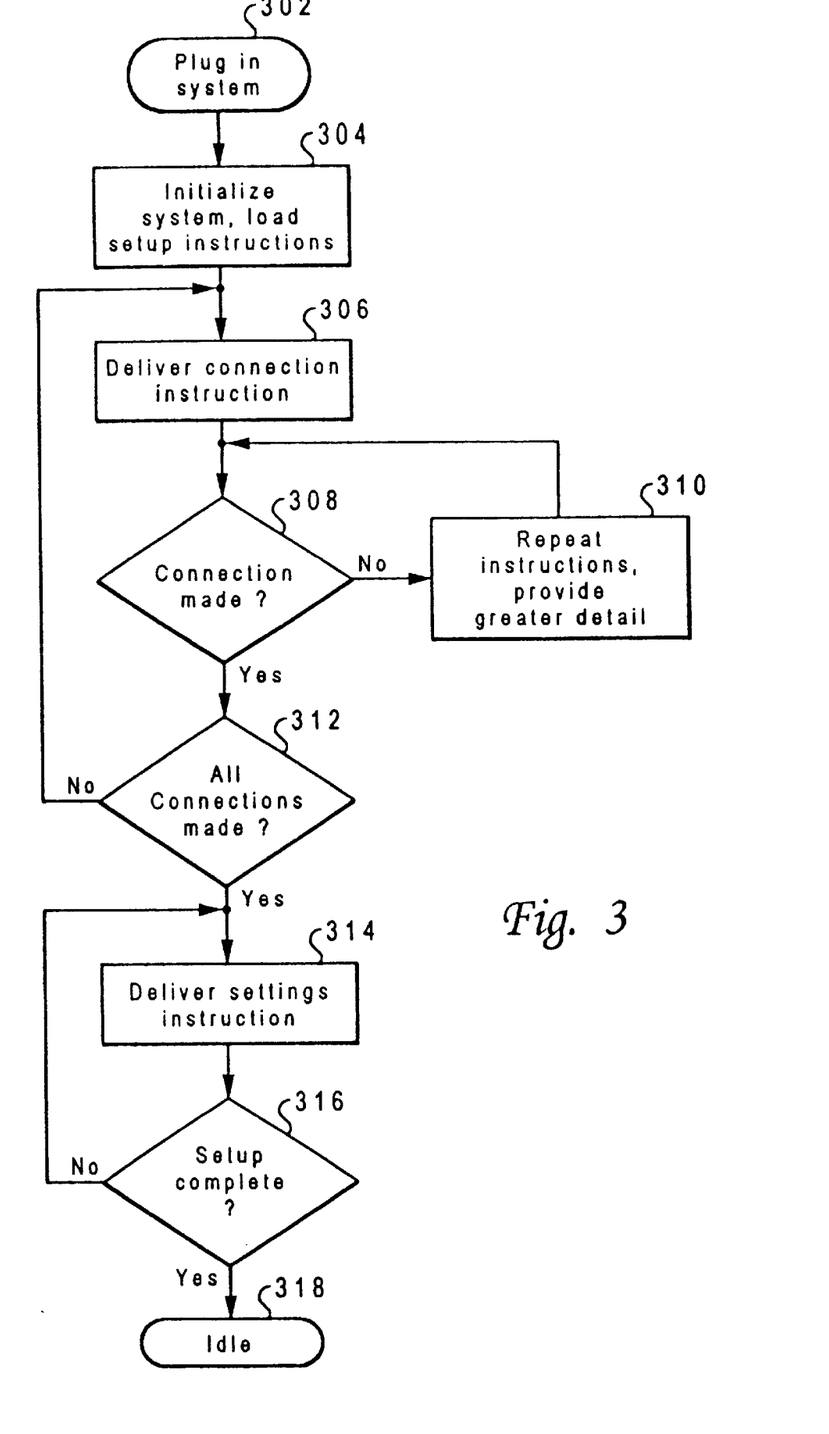
FIG. 3 depicts a high level flowchart for a process of providing audio setup instructions in accordance with a preferred embodiment of the present invention.

With reference now to FIG. 3, a high level flowchart for a process of providing audio setup instructions in accordance with a preferred embodiment of the present invention is depicted. In written instructions packaged with the data processing unit, the user is instructed to simply plug in the data processing unit, locate the infrared remote control, and press the "Web" button on the remote control. Each of these actions are well within the capabilities of any user.

The process begins at step 302, which depicts the user plugging in the data processing unit and turning it on. This is preferably the first time the data processing unit has been plugged in since it left the factory. However, the unit may have been previously plugged in and, if setup was not successfully completed, the process will continue. Alternatively, if the system was previously set up, the setup instructions may be requeued for execution at the first subsequent power up, in which case the process will continue.

The process passes next to step 304, which illustrates initialization of the system. Following system initialization, an application for delivering audio setup instructions is loaded. The setup instructions are stored in the form of sound files on the hard disk drive in the data processing unit, and are retrieved under the control of a dedicated application for delivery through internal audio capabilities. Execution of this application may be initiated by a pointer in the system initialization instructions.

The process next passes step 306, which depicts delivery of an instruction to make a required connection. Other than plugging in the power, the basic setup for a data processing system of the present invention will only require two connections: one to a television and one to a telephone line. Audio instructions are delivered directing the user to make one of these connections. Color coding of the connector conductor ends and the jacks or connectors on the data processing unit may be provided to assist the user in making the connection. For example, the audio instructions for connecting the modem to the telephone line may state: "Locate the telephone conductor in the green plastic bag. Insert one end into the telephone jack on the back of your unit, which is surrounded by a green border, and the other end into the telephone wall outlet."

The process then passes to step 308, which illustrates a determination, after an appropriate timeout period, of whether the connection which was the subject of the previous setup instruction has been made. Some mechanism should be provided for determining if each required connection has been made. Connection of the modem to the telephone outlet is easy to check, since the modem may be simply tested for a voltage or current provided by the telephone line.

Other connections, such as connection of the television, require a user input to check. For example, the data processing unit may be programmed to display a sequence of numbers, which the user is instructed to enter in the remote control. Thus, after successfully connecting the television to the data processing unit, the user will be able to see the displayed sequence and enter the numbers in the remote control. Once the television connection has been successfully established, the audio setup instructions may optionally be augmented by visual depictions.

Optional connections to the data processing unit include audio (stereo) connections, computer monitor, wired keyboard, wired mouse, and printer. Once the display is successfully connected to the television, the user may be queried as to which of these optional connections may be made to improve performance. Through the remote control, the user may select the appropriate optional components for the configuration.

As with the required connections, each optional connection should be checked to determine if the component was successfully connected. The stereo audio connection may be tested by sending audio instructions regarding entry of a sequence of numbers through the stereo connections but not through the internal speaker, then waiting for the user to enter the sequence using the remote. Similarly the computer monitor connection may be displayed by transmitted a sequence for display only to the monitor connection, and not to the television connection. The wired keyboard and wired mouse may be tested by requiring user input through the respective device. The printer may be tested by printing a numerical sequence for entry by the user in the remote.

If the connection test of step 308 results in a determination that the connection was not successfully established during the prescribed period, the process proceeds to step 310. Step 310 illustrates repeating the instructions regarding the connection. If necessary, or if the instruction has been repeated multiple times, greater detail to the instructions may be added. Unless the connection is one of the two required connections, efforts to establish the connection may be abandoned after a certain number of unsuccessful attempts, and the user instructed to repeat the setup process in the future.

If the connection was successfully established, the process proceeds instead to step 312, which depicts a determination of whether all connections, required connections and user selected optional connections, have been made. If not, the process returns to step 306 for delivery of another connection instruction. The process of steps 306–312 is repeated until all connections have been made and successfully tested.

Once all electrical connections have been established, the process proceeds to step 314, which illustrates audio delivery of a software setting instruction. Since the television connection has been successfully established at this point, visual reinforcement of the setup instructions may be provided, or visual based information required. For example, user may be directed to provide the data processing system with input indicating the visible boundaries of the television display, so that the converter circuitry may be appropriately calibrated. Alternatively, the dialup information for the user's service provider may be required. Other system settings may be required depending on the location or preferences of the user.

Once each software setting instruction is complete, the process proceeds to step 316, which illustrates a determination of whether the setup process is complete. If not, the process returns back to step 314 and continues with the software settings setup. Once the setup procedures are complete, however, the process proceeds instead to step 318, which illustrates the process becoming idle until the setup feature is again required.

Upon successful completion of the setup process, the pointer in the system initialization instructions which initiates execution of the application controlling delivery of the audio setup instructions may be deleted. However, the audio setup instructions may be retained in the data processing system and access to these instruction provided as a system menu option to enable a user to add optional components, such as a wired keyboard or printer, at a later time. The application controlling delivery of the audio setup instructions may determine whether the system is already functionally set up, then query the user as to what items are to be added or changed in the configuration.

Figure 4:
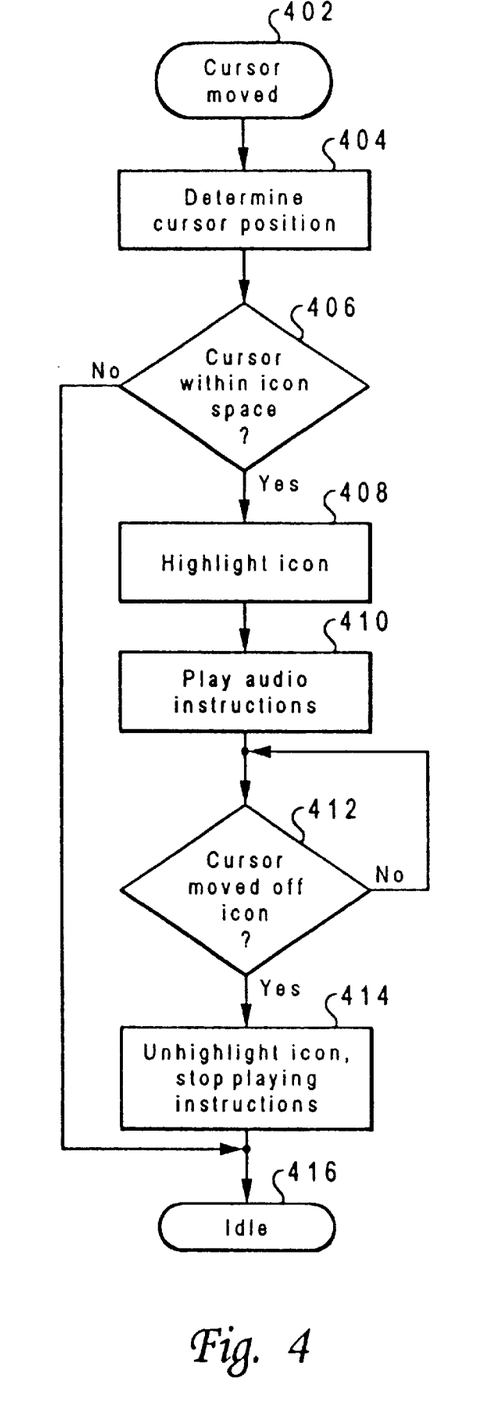
FIG. 4 is a high level flowchart for a process of employing audio use instructions in accordance with a preferred embodiment of the present invention.

Referring to FIG. 4, a high level flowchart for a process of employing audio use instructions in accordance with a preferred embodiment of the present invention is depicted. The process begins at step 402, which depicts detection of cursor movement by a user. Conventional processes for displaying a graphical user interface including icons and for providing an indicator or cursor within the display controlled by an input device are employed. The process passes to step 404, which illustrates determining the cursor position, and then to step 406, which depicts a determination of whether the cursor is located within the icon display space of an icon in the graphical user interface. If not, the process proceeds to step 416, which depicts the process becoming idle until the cursor is again moved.

If the cursor has been moved on top of an icon (i.e., within the display space occupied by the icon), the process proceeds instead to step 408, which depicts highlighting the icon, such as, for example, by changing the background color. The process then passes to step 410, which illustrates playing audio information associated with the icon. The audio information includes information regarding what events will occur if the pointing device is actuated while the icon is highlighted. This may include a description of further options which will be made available, such as "Go here to view the setup options screen." Alternatively, the audio information may include a description of the application, such as "Go here for information regarding the requirements for deducting moving expenses."

Once the audio information has begun to be played, the process passes to step 412, which depicts polling the cursor location to determine if it has been moved off the icon. The audio information may complete prior to the cursor being moved off the icon. In that event, the cursor must be moved off the icon and back on to repeat the audio information. If the cursor is moved off the icon before the audio information is complete, however, the process proceeds to step 414, which illustrates unhighlighting the icon and stopping the audio information. The process then passes to step 416, which depicts the process becoming idle until additional cursor movement is detected.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: recordable type media such as floppy disks and CD-ROMs and transmission type media such as digital and analog communication links.

The present invention provides a method of delivering setup instruction to a user which facilitates the setup process. Minimal written instructions, easily within the capacity of any user to understand, are required. The remaining setup procedures may be communicated to the user in a simple, orderly manner. Tests for successful completion of the object of each instruction ensure that the system is properly setup and allow additional information or instructions to be provided when needed. The user is not required to read complicated, technically oriented instructions addressing every possible alternative or permutation. The setup procedures are interactively limited to only the necessary work, saving the user time and frustration. In general, any data processing system or device with internal audio capabilities may benefit from the present invention.

While the invention has been particularly shown and described with reference to a preferred embodiment, it will be understood by those skilled in the art that various changes in form and detail may be made therein without departing from the spirit and scope of the invention.

What is claimed is:

1. A method of providing audio setup instructions for a data processing system, comprising:

provided said data processing system with the capability of playing digitally encoded audio information;

storing setup instructions for said data processing system in said data processing system in the form of digitally encoded audio information;

configuring said data processing system to play said setup instructions when said data processing system is connected to a power source for a first time after said storing setup instructions is performed; and upon completing play of said setup instructions, configuring said data processing system not to play said setup instructions when said data processing system is subsequently powered on from a powered off state, wherein the data processing system is provided with audio setup instructions.

2. The method of claim 1, wherein said step of storing setup instructions further comprises storing an application for playing said setup instructions.

3. The method of claim 2, wherein said step of storing an application for playing said setup instructions further comprises an application containing prompts for user input, wherein responses to said prompts control execution of said application.

4. An apparatus for providing audio setup instructions for a data processing system, comprising:

audio means for providing said data processing system with the capability of playing digitally encoded audio information;

memory means for storing setup instructions for said data processing system in said data processing system in the form of digitally encoded audio information;

configuration means for configuring said data processing system to play said setup instructions when said data processing system is connected to a power source for a first time after said storing setup instructions is performed; and means, responsive to completion of the play of said setup instructions, for configuring said data processing system not to play said setup instructions when said data processing system is subsequently powered on from a powered off state, wherein the data processing system is provided with audio setup instructions.

5. The apparatus of claim 4, wherein said memory means further comprises means for storing an application for playing said setup instructions.

6. The apparatus of claim 5, wherein said means for storing an application for playing said setup instructions further comprises means for storing an application containing prompts for user input, wherein responses to said prompts control execution of said application.

7. A method of employing audio setup instructions in a data processing system having audio capability, comprising:

storing setup instructions for said data processing system in said data processing system in the form of digitally encoded audio information;

playing said setup instructions when said data processing system is initialized for a first time after said setup instructions were stored in said data processing system; and upon successful completion of a setup application for playing said audio setup instructions, deleting a pointer initiating execution of said setup application.

8. The method of claim 7 wherein said step of playing said setup instructions further comprises:

in response to said data processing system initializing, executing said setup application for playing said audio setup instructions.

9. The method of claim 8 wherein said step of executing a setup application further comprises:

playing an audio setup instruction directing a user to make a required connection; and after a preselected timeout period, testing to determine if said required connection has been made.

10. The method of claim 9, further comprising:

responsive to determining that said required connection has not been made, replaying said audio setup instruction directing a user to make a required connection; and after said preselected timeout period, retesting to determine if said required connection has been made.

11. The method of claim 10 wherein said step of replaying said audio setup instruction further comprises:

playing additional audio setup information.

12. An apparatus for employing audio setup instructions in a data processing system having audio capability, comprising:

memory means for storing setup instructions for said data processing system in said data processing system in the form of digitally encoded audio information;

audio means for playing said setup instructions when said data processing system is initialized for a first time after said setup instructions were stored in said data processing system; and deletion means for deleting a pointer initiating execution of a setup application for playing said audio setup instructions upon successful completion of said setup application.

13. The apparatus of claim 12 wherein said audio means further comprises:

execution means, responsive to said data processing system initializing, for executing said setup application for playing said audio setup instructions.

14. The apparatus of claim 13 wherein said execution means further comprises:

audio execution means for playing an audio setup instruction directing a user to make a required connection; and testing means for testing to determine if said required connection has been made after a preselected timeout period.

15. The apparatus of claim 14, further comprising:

second audio execution means, responsive to determining that said required connection has not been made, for replaying said audio setup instruction directing a user to make a required connection; and testing means for retesting to determine if said required connection has been made after said preselected timeout period.

16. The apparatus of claim 15 wherein said second audio execution means further comprises:

audio execution means for playing additional audio setup information.

17. Audio setup instructions for a data processing system stored on computer readable media in said data processing system, comprising:

instructions for initializing said data processing system after said data processing system is connected to a power source;

load instructions for loading an application for playing audio setup information when said data processing system is initialized for a first time since said load instructions were installed; and uninstall instructions for uninstalling said load instructions when execution of said application for playing audio setup information is complete.

18. A computer program product for use with a data processing system, comprising:

a computer usable medium;

first instructions on said computer usable medium comprising setup instructions for said data processing system in the form of digitally encoded audio information;

second instructions for playing said setup instructions when said data processing system is initialized for a first time after said setup instructions were stored on said computer usable medium; and third instructions for removing said second instructions but not said setup instructions after said setup instructions have been played.

19. The computer program product of claim 18, wherein the computer usable medium is a hard disk drive.

* * * * *